US006422784B1

(12) United States Patent
Pellegrino et al.

(10) Patent No.: US 6,422,784 B1
(45) Date of Patent: Jul. 23, 2002

(54) PLATE SUPPORT DEVICE FOR USE DURING ROAD REPAIRS

(76) Inventors: Richard Pellegrino, 208 Kerby Pkwy., Fort Washington, MD (US) 20744; Melvin Reynolds, P.O. Box 691, Tappahannock, VA (US) 22560

( * ) Notice: Subject to any disclaimer, the term of this patent is extended or adjusted under 35 U.S.C. 154(b) by 0 days.

(21) Appl. No.: 09/586,358

(22) Filed: Jun. 2, 2000

(51) Int. Cl.[7] .............................................. E01C 11/16
(52) U.S. Cl. .......................................... 404/17; 404/25
(58) Field of Search ...................... 404/2, 4, 5, 11–15, 404/17, 25, 32, 33, 34, 35

(56) References Cited

U.S. PATENT DOCUMENTS

| 694,455 A | * | 3/1902 | Barker .......................... 404/25 |
| 3,426,659 A | | 2/1969 | Clarke et al. |
| 3,570,377 A | * | 3/1971 | Gerber .......................... 404/11 |
| 3,752,482 A | * | 8/1973 | Cassel .................... 273/176 B |
| 4,187,647 A | | 2/1980 | Hall |
| 4,203,686 A | * | 5/1980 | Bowman ....................... 404/25 |
| 4,717,281 A | * | 1/1988 | Shepherd et al. .............. 404/16 |
| 4,917,531 A | | 4/1990 | McGinnis |
| 4,925,191 A | * | 5/1990 | Ogilvie .................... 273/178 A |
| 4,934,715 A | * | 6/1990 | Johnson ......................... 404/25 |
| 5,061,114 A | * | 10/1991 | Hedgewick .................... 404/14 |
| 5,090,713 A | * | 2/1992 | Johnson ........................ 404/25 |
| 5,253,952 A | * | 10/1993 | Selway .......................... 404/25 |
| 5,308,188 A | | 5/1994 | Shaftner |
| 5,324,135 A | * | 6/1994 | Smith ........................... 404/25 |
| 5,360,284 A | * | 11/1994 | Allard ............................ 404/2 |
| 5,362,174 A | * | 11/1994 | Yang ............................. 404/25 |
| D353,071 S | | 12/1994 | Roberts |
| 5,403,115 A | * | 4/1995 | Flader .......................... 404/12 |
| 5,419,651 A | * | 5/1995 | Fei ............................... 404/14 |
| 5,462,383 A | * | 10/1995 | Van 'T Veer ................... 404/4 |
| 5,513,924 A | * | 5/1996 | Alghunaim .................... 404/14 |
| 5,536,110 A | | 7/1996 | Tompkins et al. |
| 5,640,821 A | * | 6/1997 | Koch ............................ 404/33 |
| 5,733,444 A | * | 3/1998 | Johnson ......................... 404/4 |
| 6,109,824 A | * | 8/2000 | Annes ........................... 404/25 |

* cited by examiner

*Primary Examiner*—Thomas B. Will
*Assistant Examiner*—Alexandra K. Pechhold

(57) ABSTRACT

A plate support device for use during road repairs for creating a smooth transition from the road to the plate member. The plate support device for use during road repairs includes a support member having a bottom wall and a plurality of tapered side walls with each side wall having an outer top surface, an outer lower surface, and an outer intermediate surface which is slanted at an angle relative to the top surface and lower surface thus forming a ramp portion. The bottom wall has a plurality of holes therein, which include a first set of holes and a second set of holes which is larger than the first set of holes for fastening the support member and plate member to the road.

1 Claim, 2 Drawing Sheets

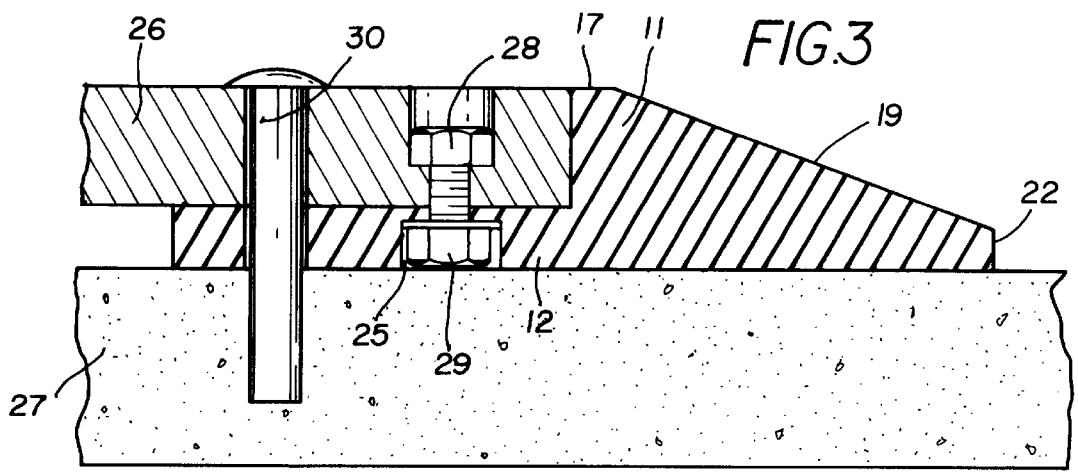
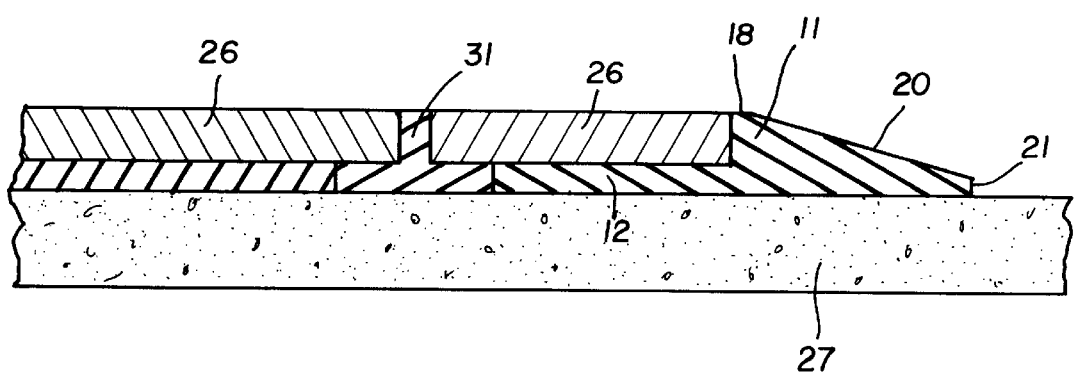

PLATE SUPPORT DEVICE FOR USE DURING ROAD REPAIRS

BACKGROUND OF THE INVENTION

1. Field of the Invention

The present invention relates to a temporary device for creating a smooth transition from the road across the plate member and more particularly pertains to a new plate support device for use during road repairs for creating a smooth transition from the road to the plate member.

2. Description of the Prior Art

The use of a temporary device for creating a smooth transition from the road across the plate member is known in the prior art. More specifically, a temporary device for creating a smooth transition from the road across the plate member heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,917,531; U.S. Pat. No. 5,308,188; U.S. Pat. No. Des. 353,071; U.S. Pat. No. 4,187,647; U.S. Pat. No. 5,536,110; and U.S. Pat. No. 3,426,659.

While these devices fulfill their respective, particular objectives and requirements, the aforementioned patents do not disclose a new plate support device for use during road repairs. The inventive device includes a support member having a bottom wall and a plurality of tapered side walls with each side wall having an outer top surface, an outer lower surface, and an outer intermediate surface which is slanted at an angle relative to the top surface and lower surface thus forming a ramp portion. The bottom wall has a plurality of holes therein, which include a first set of holes and a second set of holes which is larger than the first set of, holes for fastening the support member and plate member to the road.

In these respects, the plate support device for use during road repairs according to the present invention substantially departs from the conventional concepts and designs of the prior art, and in so doing provides an apparatus primarily developed for the purpose of creating a smooth transition from the road to the plate member.

SUMMARY OF THE INVENTION

In view of the foregoing disadvantages inherent in the known types of temporary device for creating a smooth transition from the road across the plate member now present in the prior art, the present invention provides a new plate support device for use during road repairs construction wherein the same can be utilized for creating a smooth transition from the road to the plate member.

The general purpose of the present invention, which will be described subsequently in greater detail, is to provide a new plate support device for use during road repairs which has many of the advantages of the temporary device for creating a smooth transition from the road across the plate member mentioned heretofore and many novel features that result in a new plate support device for use during road repairs which is not anticipated, rendered obvious, suggested, or even implied by any of the prior art temporary device for creating a smooth transition from the road across the plate member, either alone or in any combination thereof.

To attain this, the present invention generally comprises a support member having a bottom wall and a plurality of tapered side walls with each side wall having an outer top surface, an outer lower surface, and an outer intermediate surface which is slanted at an angle relative to the top surface and lower surface thus forming a ramp portion. The bottom wall has a plurality of holes therein, which include a first set of holes and a second set of holes which is larger than the first set of holes for fastening the support member and plate member to the road.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new plate support device for use during road repairs which has many of the advantages of the temporary device for creating a smooth transition from the road across the plate member mentioned heretofore and many novel features that result in a new plate support device for use during road repairs which is not anticipated, rendered obvious, suggested, or even implied by any of the prior art temporary device for creating a smooth transition from the road across the plate member, either alone or in any combination thereof.

It is another object of the present invention to provide a new plate support device for use during road repairs which may be easily and efficiently manufactured and marketed.

It is a further object of the present invention to provide a new plate support device for use during road repairs which is of a durable and reliable construction.

An even further object of the present invention is to provide a new plate support device for use during road repairs which is susceptible of a low cost of manufacture with regard to both materials and labor, and which accordingly is then susceptible of low prices of sale to the consuming public, thereby making such plate support device for use during road repairs economically available to the buying public.

Still yet another object of the present invention is to provide a new plate support device for use during road repairs which provides in the apparatuses and methods of the prior art some of the advantages thereof, while simultaneously overcoming some of the disadvantages normally associated therewith.

Still another object of the present invention is to provide a new plate support device for use during road repairs for creating a smooth transition from the road to the plate member.

Yet another object of the present invention is to provide a new plate support device for use during road repairs which includes a support member having a bottom wall and a plurality of tapered side walls with each side wall having an outer top surface, an outer lower surface, and an outer intermediate surface which is slanted at an angle relative to the top surface and lower surface thus forming a ramp portion. The bottom wall has a plurality of holes therein, which include a first set of holes and a second set of holes which is larger than the first set of holes for fastening the support member and plate member to the road.

Still yet another object of the present invention is to provide a new plate support device for use during road repairs that can be conveniently and easily attached upon the areas of the road where work has been started.

Even still another object of the present invention is to provide a new plate support device for use during road repairs that saves wear and tear on a person's vehicle including the tires as one drives over the plate member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view of the present invention supporting a plate member and being securely attached to a road.

FIG. 4 is a side elevational view of a second embodiment of the present invention.

DESCRIPTION OF THE PREFERRED EMBODIMENT

Figure 1:
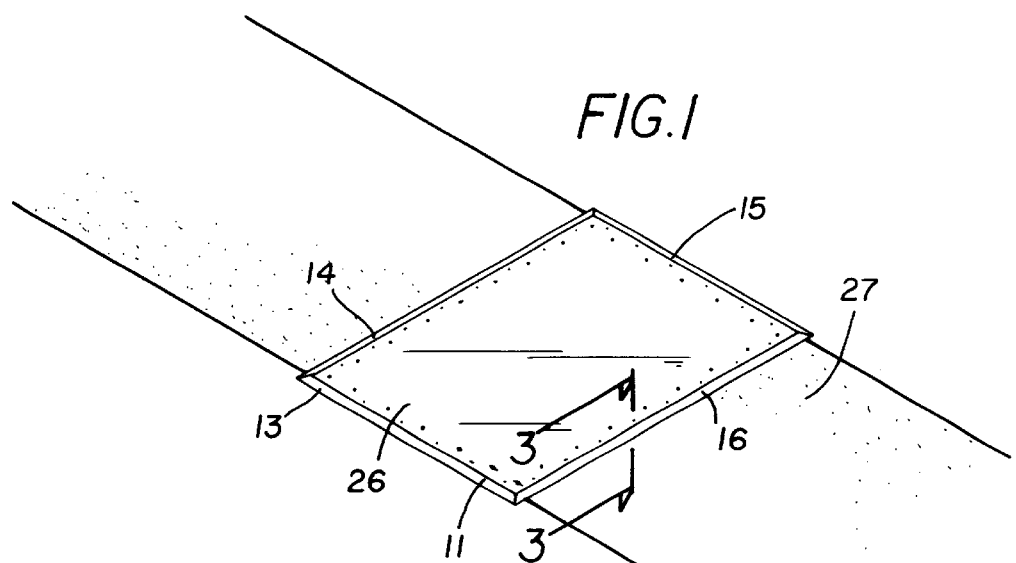
FIG. 1 is a perspective view of a new plate support device for use during road repairs according to the present invention and shown in use.
Figure 2:
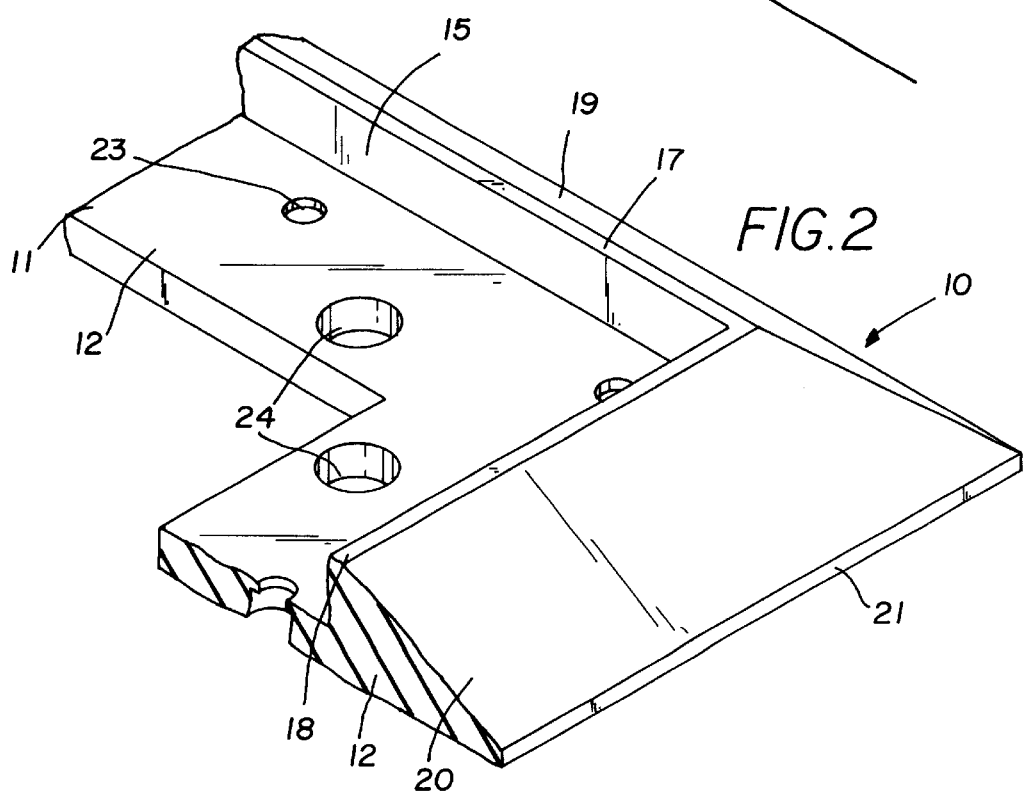
FIG. 2 is a partial top perspective view of the present invention.

With reference now to the drawings, and in particular to FIGS. 1 through 4 thereof, a new plate support device for use during road repairs embodying the principles and concepts of the present invention and generally designated by the reference numeral 10 will be described.

As best illustrated in FIGS. 1 through 4, the plate support device for use during road repairs 10 generally comprises a support member 11 having a bottom wall 12 and a plurality of tapered side walls 13–16 integrally attached to the bottom wall 12. The support member 11 is adapted to receive and support a metal plate member 26 upon the bottom wall 12 and between the side walls 13–16. Each of the side walls 13–16 has a top surface 17,18, an outer lower surface 21,22, and an outer intermediate surface 19,20 which has a greater surface area than either of the top surface 17,18 or the outer lower surface 21,22. Each of the side walls 13–16 is tapered downwardly and outwardly from the top surface 17,18 of the side wall 13–16 to the outer lower surface 21,22 of the side wall 13–16 with the outer intermediate surface 19,20 of each of the side walls 13–16 being slanted downwardly and outwardly from the top surface 17,18 of the side wall 13–16 to the outer lower surface 21,22 of the side wall 13–16 thus forming essentially a ramp portion. The outer intermediate surface 19,20 of each of the side walls 13–16 is angled 10 relative to the top surface 17,18 and the outer lower surface 21,22. The top surface 19,20 of each of the side walls 13–16 is disposed generally parallel to the bottom wall 12, and the outer lower surface 21,22 of each of the side walls 13–16 is disposed generally perpendicular to the bottom wall 12. The bottom wall 12 includes a plurality of holes 23,24 spaced about and disposed through the bottom wall 12 with the holes 23,24 including a first set of holes 23 and a second set of holes 24 which is relatively larger than the first set of holes 23. The first set of the holes 23 are adapted to receive fastening members 28 for fastening a metal plate member 26 upon the bottom wall 12. The second set of holes 24 are adapted to receive spike-like members 30 for fastening the metal plate member 26 and the support member 11 to a road 27. The bottom wall 12 includes annular recessed portions 25 being disposed in a bottom side thereof and being disposed about the first set of holes 23. Each of the annular recessed portions 25 is adapted to receive a head 29 of a bolt such that the head 29 of the bolt is flush with the bottom side of the bottom wall 12. The support member 11 is made of rubber and has a width of approximately 8 inches. The side walls 13–16 have a height of approximately 1 ¼ inches, and the bottom wall 12 has a thickness of approximately ½ inch. The support member 11 is adapted to receive the plate member 26 flush with the outer top surfaces 17,18 of the side walls 13–16.

As a second embodiment, the support member 11 includes a spacer member 31 securely, vertically and conventionally disposed in the bottom wall 12 and being spaced from the side walls 13–16 which are disposed parallel to the spacer member 31 for allowing a plurality of metal plate members 26 to be received and supported upon the bottom wall 12 of the support member 11.

In use, the support member 11 is placed upon an area of the road 27 where certain road work has been started. The support member 11 essentially forms a smooth transition from the road to the metal plate member 26 as a vehicle travels upon the road 27 where work is being done.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A plate support system, comprising:

a plate having a perimeter edge and a substantially uniform thickness; and a support member having a bottom wall and a plurality of tapered side walls integrally attached to said bottom wall, said support member forming a continuous perimeter that defines an unobstructed opening adapted for positioning about a hole in a pavement surface for permitting work to be performed through said opening and in said hole, said opening being bordered by the bottom wall of said support member, the bottom wall of said support member having an upper surface for supporting the plate upon said bottom wall and a lower surface for resting on a pavement surface, the upper and lower surfaces of said bottom wall being substantially parallel to each other, each of said side walls having an inner stop surface extending upwardly from and substantially perpendicular to the upper surface of said bottom wall for restricting lateral movement of the plate off of said bottom wall when the plate is rested on the upper surface of said bottom wall;

wherein each of said side walls has a top surface, a outer lower surface, and an outer intermediate surface which has a greater surface area than either of said top surface or said outer lower surface;

wherein each of said side walls is tapered downwardly and outwardly from said top surface of said side wall to said outer lower surface of said side wall;

wherein said outer intermediate surface of each of said side walls is slanted downwardly and outwardly from said top surface of said side wall to said outer lower surface of said side wall thus forming essentially a ramp portion;

wherein said outer intermediate surface of each of said side walls is angled relative to said top surface and said outer lower surface;

wherein said top surface of each of said side walls is disposed generally parallel to said bottom wall;

wherein said outer lower surface of each of said side walls is disposed generally perpendicular to said bottom wall;

wherein said bottom wall includes a plurality of holes spaced about and disposed through said bottom wall;

wherein said holes includes a first set of said holes and a second set of said holes which is relatively larger than said first set of holes, said first set of said holes being adapted to receive fastening members for fastening a metal plate member upon said bottom wall, said second set of said holes being adapted to receive spike-like members for fastening the metal plate member and said support member to a road;

wherein said bottom wall includes annular recessed portions being disposed in a bottom side thereof and being disposed about said first set of said holes, each of said annular recessed portions being adapted to receive a head of a bolt such that the head of the bolt is flush with said bottom side of said bottom wall;

wherein said support member includes at least one spacer member securely and vertically disposed in said bottom wall and being spaced from said side walls which are disposed parallel to said at least one spacer member for allowing a plurality of metal plate members to be received and supported upon said bottom wall of said support member;

wherein a height of the inner stop surface measured from the top surface of said bottom wall to a top surface of said side wall is substantially equal to the thickness of said plate;

wherein the inner stop surface of said side wall has a shape and size about said opening substantially the same as a shape and size of the perimeter edge of said plate; and wherein said plate has a plurality of holes therethrough positioned for aligning with said plurality of holes in the bottom wall of said support member such that a fastener may be driven through said holes and into a pavement surface of a road.

* * * * *